United States Patent [19]
Brueske

[11] Patent Number: 5,893,027
[45] Date of Patent: Apr. 6, 1999

[54] FULLY INTEGRATED TWO-WAY RADIO TRANSMITTER UTILIZING CURRENT MODE TRANSMIT BUFFER AND METHOD OF USING SAME

[75] Inventor: Daniel E. Brueske, Sunrise, Fla.

[73] Assignee: Motorola, Inc., Schaumburg, Ill.

[21] Appl. No.: 740,939

[22] Filed: Nov. 5, 1996

[51] Int. Cl.⁶ ........................................ H04B 1/38
[52] U.S. Cl. .................. 455/118; 455/73; 455/87; 455/78; 455/91
[58] Field of Search ................. 455/118, 91, 78, 455/73, 87

[56] References Cited

U.S. PATENT DOCUMENTS 4,972,346  11/1990  Kawano et al. ..................... 455/33
5,438,703  8/1995  Ng et al. ............................ 455/127

*Primary Examiner*—Donnie L. Crosland
*Attorney, Agent, or Firm*—Frank M. Scutch, III

[57] ABSTRACT

A wideband fully integrated two-way radio transmitter (100) includes a voltage controlled oscillator (VCO) (101) for providing a voltage at a radio frequency. A divider (103) is used reducing the radio frequency (RF) signal from the VCO to a an intermediate frequency. A voltage-to-current converter is used for changing the voltage of the intermediate frequency RF signal to an RF current. A transmit buffer is then used for amplifying the RF current supplied by the voltage-to-current converter for amplification by a power amplifier. The fully integrated current mode transmit buffer offers the advantage of amplification over a large bandwidth while providing isolation between the transmit buffer and the VCO.

9 Claims, 2 Drawing Sheets

5,893,027

FULLY INTEGRATED TWO-WAY RADIO TRANSMITTER UTILIZING CURRENT MODE TRANSMIT BUFFER AND METHOD OF USING SAME

TECHNICAL FIELD

This invention relates in general to radio frequency (RF) isolation and more particularly to RF isolation in fully integrated circuit radio transceivers.

BACKGROUND

In a number of modern two-way radio and cellular telephone products, zero intermediate frequency (ZIF) technology is used in the radio receiver. The ZIF operates using the incoming radio frequency signal where it is mixed or heterodyned with an internal local oscillator (LO) at approximately the same frequency. A resultant or intermediate frequency signal is created by this process. This intermediate frequency is at approximately 0 hertz. The intermediate frequency signal is then passed through a respective low pass filter, demodulator, and audio processing circuits where it is output in the form of a recovered audio signal available to a user. This process is generally referred to as direct conversion.

Since the LO and desired frequency are roughly equal, the LO can also conveniently be used to transmit a signal at that same frequency. Thus, a common LO synthesizer can be used to both transmit and receive in the direct conversion two-way radio transceiver. This technique needs only a single voltage controlled oscillator (VCO). In the radio transmitter portion of the transceiver, the VCO is typically run at twice the desired signal frequency and later divided by two down to the desired frequency. When used in this manner, this simple system is ideal for integration onto a single microelectronic silicon chip-commonly known as an integrated circuit (IC). Of course before the transmit signal is passed to a RF power amplifier, the signal is generally buffered and amplified.

Unfortunately problems occur with such a localized system where many RF signals are used in such a manner. The close circuit proximity facilitates signal cross coupling through the common silicon substrate. Therefore one system can adversely react with the other. Additionally, problems also can occur in the amount of RF feedback through circuit parasitics and this can also disrupt the operation of the VCO or synthesizer. The transmit buffer output signal, typically on the order of +5 dBm, must be isolated from the VCO output signal having an amplitude of −20 dBm or less. Thus, a significant amount of RF isolation is necessary to keep the large amplitude of the transmit buffer from interfering with the small VCO signal. The integrated circuit's signal nodes will generally have some parasitic capacitance to a common substrate or node. It is by this common node that the various oscillator and synthesizer circuits interact with one another. By decreasing the resistance at a given circuit's node, the substrate and circuit parasitic coupling can be reduced. This is achieved by using the tx buffer in a current mode operation.

Moreover, each time the IC package pin count is increased, or any external parts are needed in the design of a transmit buffer, an incremental construction cost will occur. This is due to the increase in manufacturing complexity and total part count. Additionally, in many transmit buffer designs external bypass parts are necessary because they are difficult to integrate onto silicon. Further, the bandwidth of the oscillator will depend upon the selection of these devices. Different external parts are often necessary to supply a variation in frequency ranges. This tends to even further complicate already complex manufacturing techniques. External connections other than the output of the IC are highly undesirable in an IC transmit buffer circuit.

Therefore, the need exists to provide a transmitter circuit where the transmit signals on a single chip IC design remain locally isolated while allowing wideband operation, with inexpensive full system integration.

DETAILED DESCRIPTION OF THE PREFERRED EMBODIMENT

Figure 1:
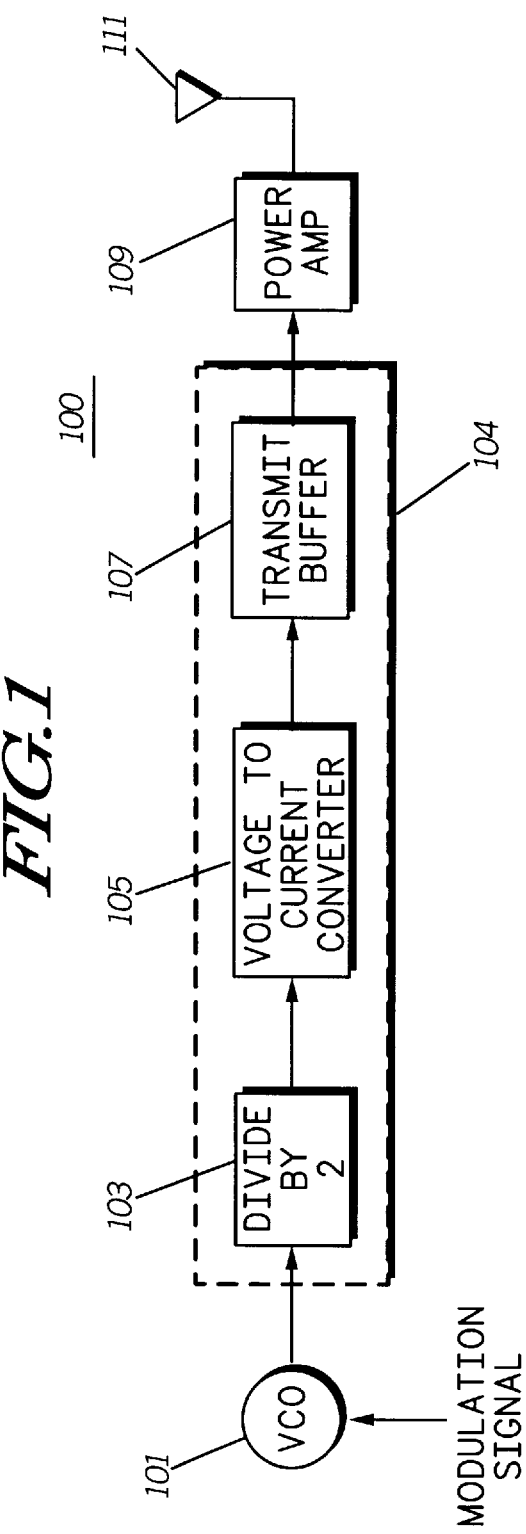
FIG. 1 is a block diagram showing operation of a transmitter using a voltage controller oscillator commonly used with radios.

Referring now to FIG. 1, a wideband fully integrated radio transmitter 100 includes a voltage controlled oscillator (VCO) 101 that provides a modulated signal to divider 103. Typically, the divider 103 is a high speed D-type flip flop that not only divides and lowers the frequency of the signal by some integer amount but also provides RF isolation between the VCO and the stages after the divider. Although a divide-by-two is shown in this application, it will be evident to those skilled in the art that division of the signal is possible by any integer amount.

The divided signal is then applied to a voltage-to-current converter 105. A transconductance using a differential bipolar pair of semiconductor devices is used to convert the radio frequency (RF) voltage to a RF current. The RF transmit current then passes through the transmit buffer 107. The transmit buffer 107 is a fully integrated wideband amplifier which drives the power amplifier 109. The RF power amplifier provides energy to the antenna 111 for subsequent RF emission. As seen in FIG. 1, the divider 103, the voltage-to-current converter 105 and the transmit buffer 107 are integrated onto one semiconductor chip 104.

Figure 2:
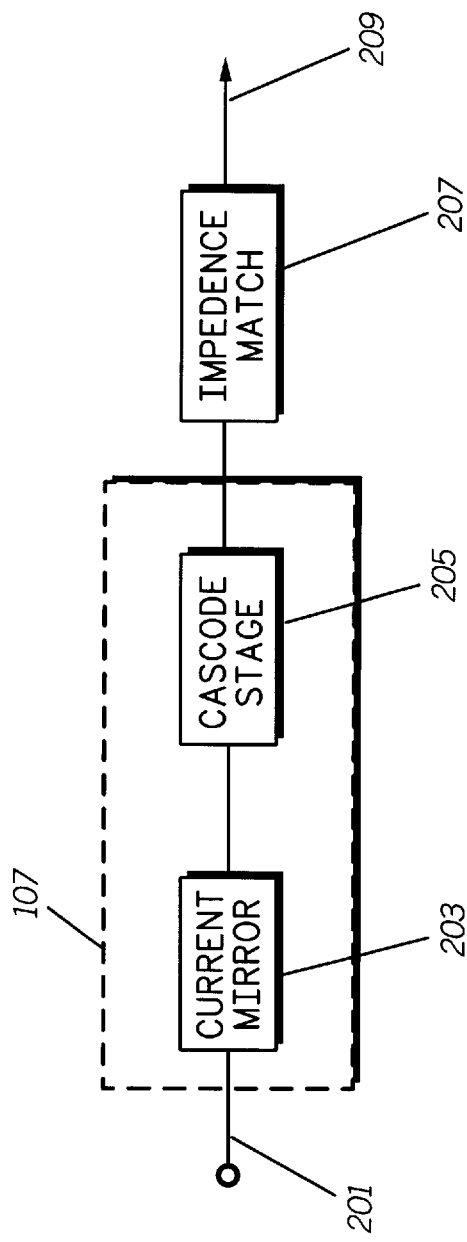
FIG. 2 is a block diagram of the transmit buffer used in accordance with the invention shown in FIG. 1.

In FIG. 2, a circuit diagram of the transmit buffer 107 illustrates input 201 from the voltage-to-current converter 105 and a current mirror 203 that acts to amplify the RF current supplied to it. The current mirror is well suited for this application since it eliminates the need for external biasing parts, as will be evident by those skilled in the art. Also, the current mirror provides a low impedance point which improves signal bandwidth and isolation from any unwanted substrate or parasitic coupled signals.

With a substantially low impedance node, the resistor-capacitor or RC time constant of the devices used in the transmit buffer will be very small. This increases the bandwidth of the transmit buffer. Thus, RF signals from a range of approximately 20 Mhz to 500 Mhz can easily be amplified. This amplified signal is then applied to a cascode stage that offers improved bandwidth operation and isolation against the amplified energy generated by the current mirror 203 and cascode stage 205. Finally, an impedance matching stage 207 may be used to match the output of the cascode stage 205 to the input of the power amplifier 109 which is connected to the impedance match output 209.

Figure 3:
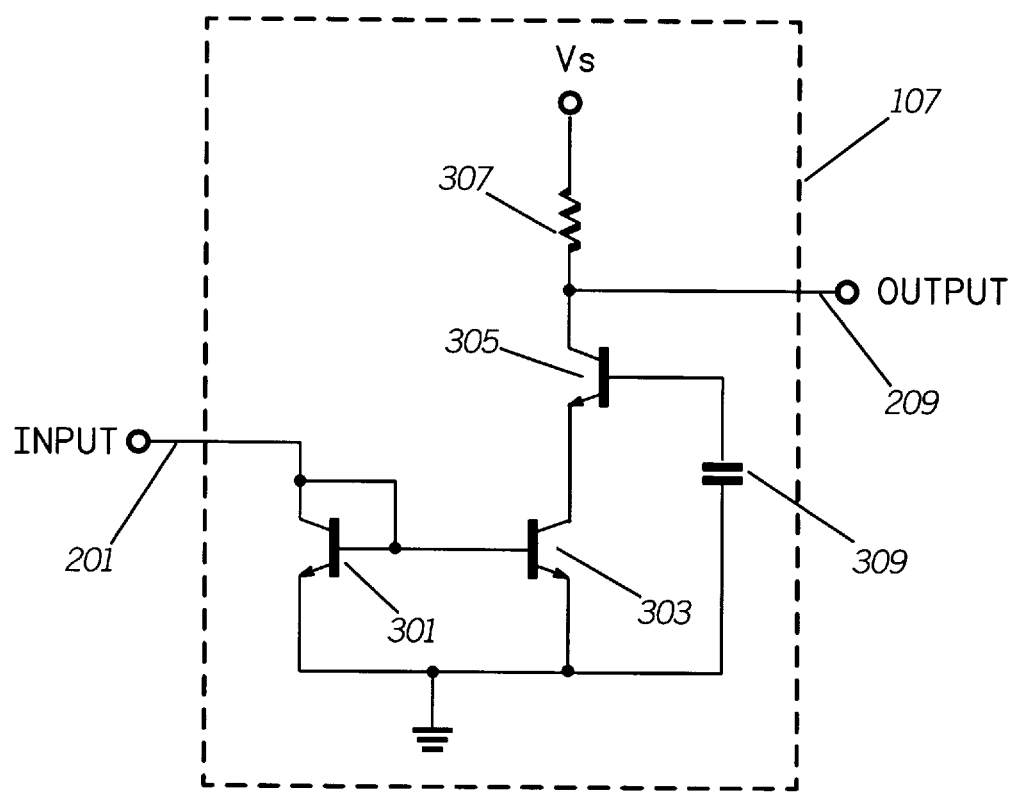
FIG. 3 is a circuit diagram of the transmit buffer as seen in FIG. 2.

In FIG. 3, the circuit diagram of the transmit buffer 107 includes two bipolar transistors 301 and 303 connected to form a current mirror in a common emitter configuration. The current mirror acts to amplify the signal at the input 201 where it is then supplied to a third bipolar device 305 that completes the cascode stage with bipolar transistor 303. The resistor 307 is used to keep the transmit buffer from going into an unstable mode of operation. Capacitor 309 couples the RF signal at the base of the third bipolar device 305 to a ground potential. The output 209 is connected to the collector of the third bipolar device 305 where the amplified RF signal can be used by the impedance matched power amplifier 109 for further amplification.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wideband fully integrated two-way radio transceiver in a single integrated circuit (IC) package operating in a full duplex mode comprising:

a voltage controlled oscillator (VCO) for providing at least one radio frequency;

a divider for changing the at least one radio frequency to an intermediate frequency;

a voltage-to-current converter for changing the signal voltage to a radio frequency (RF) current; and a transmit buffer for amplifying the RF current for use by a power amplifier.

2. A wideband fully integrated two-way radio transmitter as in claim 1 wherein the transmit buffer is comprised of at least one current mirror for providing wideband operation.

3. A wideband two-way radio transmitter as in claim 2 wherein the transmit buffer is comprised of at least one cascode stage for further improving the bandwidth operation.

4. A wideband direct conversion two-way radio transceiver for application as a single integrated circuit (IC) device in a single IC package operating in a full duplex mode, supplied with a local oscillator (LO) signal from a voltage controlled oscillator (VCO) comprising:

a frequency divider for reducing the frequency of the LO signal to provide a divided signal;

a voltage-to-current converter for converting the divided signal to an RF current; and a transmit buffer including at least one current mirror for amplification of the RF current and at least one cascode amplifier for isolating the current mirror from RF current flowing in a reverse manner.

5. A wideband two-way radio transmitter as in claim 4 wherein at least one cascode stage acts as a high output impedance and a low input impedance.

6. A wideband two-way radio transmitter as in claim 5 wherein at least one current mirror includes a first transistor and second transistor connected in a common emitter configuration.

7. A method of isolating a transmit signal from a voltage controlled oscillator (VCO) in a transceiver located in a single integrated circuit die operating in a full duplex mode, used in a two-way radio comprising the steps of:

dividing a signal input from the VCO to provide a divided radio frequency (RF) signal that is isolated from the VCO;

converting the divided signal to a RF current; and whereby the RF current is amplified using a current mirror and cascode stage for presentation to an RF power amplifier.

8. A method of isolating a transmit signal as in claim 7 further comprising the step of:

isolating the amplified RF current using at least one cascode stage for preventing the amplified RF current from propagating in a reverse direction.

9. A method of isolating a transmit signal as in claim 7 wherein the amplifying step further comprises the step of:

forming the current mirror using a first transistor and a second transistor connected in a common emitter configuration.

* * * * *